United States Patent
Boulos et al.

(10) Patent No.: US 9,516,734 B2
(45) Date of Patent: Dec. 6, 2016

(54) PLASMA REACTOR FOR THE SYNTHESIS OF NANOPOWDERS AND MATERIALS PROCESSING

(75) Inventors: Maher I. Boulos, Sherbrooke (CA); Jerzy Jurewicz, Sherbrooke (CA); Jiayin Guo, Sherbrooke (CA)

(73) Assignee: TEKNA PLASMA SYSTEMS INC., Quebec (CA)

( * ) Notice: Subject to any disclaimer, the term of this patent is extended or adjusted under 35 U.S.C. 154(b) by 1261 days.

(21) Appl. No.: 13/259,760

(22) PCT Filed: Mar. 24, 2010

(86) PCT No.: PCT/CA2010/000443
§ 371 (c)(1),
(2), (4) Date: Feb. 14, 2012

(87) PCT Pub. No.: WO2010/108272
PCT Pub. Date: Sep. 30, 2010

(65) Prior Publication Data
US 2012/0201266 A1    Aug. 9, 2012

Related U.S. Application Data (60) Provisional application No. 61/162,953, filed on Mar. 24, 2009.

(51) Int. Cl.
*H05H 1/00* (2006.01)
*H05H 1/30* (2006.01)
(Continued)

(52) U.S. Cl.
CPC ............... *H05H 1/30* (2013.01); *B01J 19/088* (2013.01); *H05H 1/42* (2013.01); *H05H 1/44* (2013.01);
(Continued)

(58) Field of Classification Search
CPC .................... B01J 19/088; B01J 2219/00148; B01J 2219/00252; B01J 2219/0871; B01J 2219/0879; B01J 2219/0894; H05H 1/30; H05H 1/42; H05H 1/44; B22F 2999/00
USPC .................... 373/18–25; 219/121.36–121.86, 219/121.54, 121.55, 121.056; 266/144, 266/160, 177, 212; 110/345, 346, 347, 110/165 R
See application file for complete search history.

(56) References Cited

U.S. PATENT DOCUMENTS

| 3,475,158 A | 10/1969 | Neuenschwander |
| 3,551,377 A | 12/1970 | Andrianov |

(Continued)

FOREIGN PATENT DOCUMENTS

| CN | 2185748 Y | 12/1994 |
| CN | 1182456 A | 5/1998 |

(Continued)

OTHER PUBLICATIONS

International Search Report for PCT/CA2010/000443, mailed Jun. 17, 2010.
(Continued)

*Primary Examiner* — David Angwin
*Assistant Examiner* — Amit K Singh
(74) *Attorney, Agent, or Firm* — Venable LLP; Lars H. Genieser; Jeffri A. Kaminski (57) ABSTRACT

A plasma reactor comprises a torch body comprising a plasma torch for generating plasma, a reactor section in fluid communication with the torch body for receiving the plasma from the plasma torch, and a quench section in fluid communication with the reactor section. The quench section comprises an inner wall defining a quench chamber, the inner wall has a serrated configuration, and the quench chamber has an upstream end adjacent the reactor section and an opposite downstream end. The plasma reactor also comprises at least one heating element in thermal communication with the reactor section, wherein the at least one heating element provides for selectively modulating a temperature within the reactor section.

24 Claims, 8 Drawing Sheets

(51) Int. Cl.
  *B01J 19/08* (2006.01)
  *H05H 1/42* (2006.01)
  *H05H 1/44* (2006.01)

(52) U.S. Cl.
  CPC ............ *B01J 2219/00148* (2013.01); *B01J 2219/00252* (2013.01); *B01J 2219/0871* (2013.01); *B01J 2219/0879* (2013.01); *B01J 2219/0894* (2013.01); *B22F 2999/00* (2013.01)

(56) References Cited

U.S. PATENT DOCUMENTS

| | | | |
|---|---|---|---|
| 5,122,309 | A | 6/1992 | Moerer |
| 5,200,595 | A | 4/1993 | Boulos et al. |
| 5,369,241 | A | 11/1994 | Taylor et al. |
| 5,753,004 | A * | 5/1998 | Hanai et al. ............ 75/10.14 |
| 5,844,195 | A * | 12/1998 | Fairbairn et al. ........ 219/121.43 |
| 6,379,419 | B1 | 4/2002 | Celik et al. |
| 6,398,125 | B1 | 6/2002 | Liu et al. |
| 6,551,377 | B1 | 4/2003 | Leonhardt |
| 7,494,527 | B2 | 2/2009 | Jurewicz et al. |
| 7,910,048 | B2 | 3/2011 | Jurewicz et al. |
| 2007/0221635 | A1 | 9/2007 | Boulos et al. |
| 2007/0280863 | A1 | 12/2007 | Wira |
| 2007/0292321 | A1 | 12/2007 | Plischke et al. |
| 2010/0192817 | A1* | 8/2010 | Shekell ............ F23D 1/00 110/261 |

FOREIGN PATENT DOCUMENTS

| | | |
|---|---|---|
| JP | 4-59903 | 2/1992 |
| JP | 2002-336688 | 11/2002 |
| JP | 2005-515146 | 5/2005 |
| JP | 2005-218938 | 8/2005 |
| JP | 2006-55839 | 3/2006 |
| JP | 2008-528259 | 7/2008 |
| RU | 2048279 C1 | 11/1995 |
| WO | WO 03/062146 | 7/2003 |
| WO | WO-03/097521 A1 | 11/2003 |

OTHER PUBLICATIONS

Davenport, William H., et al., "Rhenium Chemicals—Their Properties and Applications," Cleveland Refractory Metals (Division, Chase Brass & Copper Co.), 1969.

Jungfleisch, M.L., et al., "Monographies sur les Métaux De Haute Pureté," Chapitre 10 ("Rhenium") pp. 235-242, Masson et Cie, Éditeurs, 1972.

Notice of Allowance issued in U.S. Appl. No. 11/041,870 dated Oct. 7, 2008.

Notice of Allowance issued in U.S. Appl. No. 12/349,486 dated Nov. 17, 2010.

Office Action issued in U.S. Appl. No. 11/041,870 dated Dec. 26, 2007.

Office Action issued in U.S. Appl. No. 12/349,486 dated Aug. 6, 2010.

Office Action issued in U.S. Appl. No. 12/349,486 dated Feb. 22, 2010.

Restriction Requirement issued in U.S. Appl. No. 11/041,870 dated Aug. 14, 2007.

Tribalat S., Rhénium et technetium, Gauthier-Villars, Paris, 1957.

Extended European Search Report issued in European Patent Application No. 10755362.0 dated Aug. 13, 2014.

Office Action from Japanese Patent Application No. 2012-501094 mailed May 19, 2014 (English-language translation).

Requirement for Restriction/Election in U.S. Appl. No. 11/041,870, mailed on Aug. 14, 2007.

Office Action in U.S. Appl. No. 11/041,870, mailed on Dec. 26, 2007.

Notice of Allowance with Examiner's Amendment in U.S. Appl. No. 11/041,870, mailed on Oct. 7, 2008.

Office Action in U.S. Appl. No. 12/349,486, mailed on Feb. 22, 2010.

Office Action in U.S. Appl. No. 12/349,486, mailed on Aug. 6, 2010.

Examiner Interview Summary in U.S. Appl. No. 12/349,486, mailed on Nov. 10, 2010.

Notice of Allowance with Examiner's Amendment in U.S. Appl. No. 12/349,486, mailed on Nov. 17, 2010.

* cited by examiner

PLASMA REACTOR FOR THE SYNTHESIS OF NANOPOWDERS AND MATERIALS PROCESSING

FIELD

The present specification generally relates to a process and apparatus for producing nanopowders and materials processing. More specifically, but not exclusively, the present specification relates to a plasma reactor comprising a torch body and a reactor section in which the temperature field is readily controlled. Furthermore, the present specification relates to the use of such a plasma reactor for the synthesis of nanopowders and materials processing.

BACKGROUND

The use of plasma technology for the synthesis of nanopowders and materials processing has attracted considerable attention over the past decade. The principal advantage of plasma technology resides in its ability to decouple the chemistry of the process from the energy level (i.e. temperature) at which a given chemical or physical transformation is carried out. In contrast to combustion flame reactors in which the reaction medium contains the combustion products, plasma technology constitutes a high temperature process in which it is possible to independently control the chemistry of the reaction process and the reaction temperature. Plasma reactors can be operated using an inert, an oxidizing or a reducing atmosphere at temperatures reaching 10,000 degrees Kelvin or higher.

Figure 1:
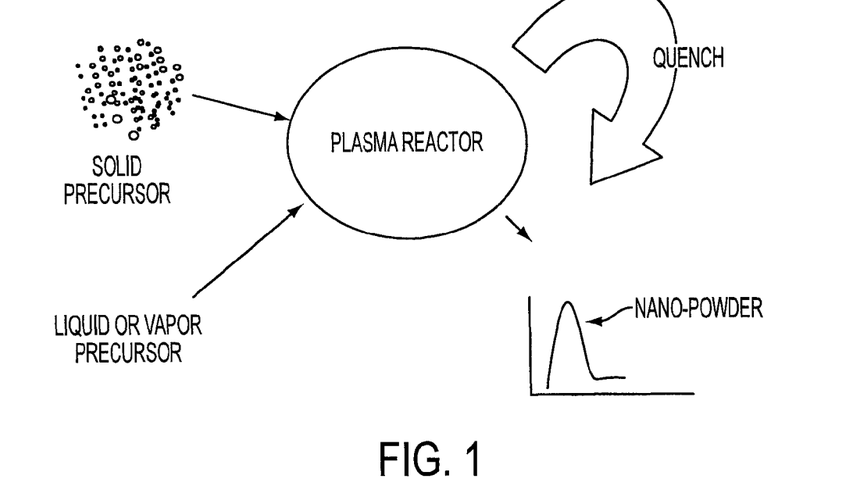
FIG. 1 is a schematic illustration of a standard process for the synthesis of nanopowders using plasma technology.

A standard technique for the synthesis of nanopowders using plasma technology involves evaporating the nanopowder precursor, whether in the form of a solid or a liquid, followed by quenching the generated vapor under well controlled conditions (FIG. 1). In the quenching step, the vapours are cooled either through contact with a cold surface or through direct mixing with a cold gas (i.e. quench gas). In either case, the quenching process goes through a nucleation step followed by particle growth and agglomeration. The final particle size distribution of the nanopowder is directly dependent on the temperature field in the quench zone of the plasma reactor.

Due to the difficulty in keeping the vapours from contacting colder surfaces within the plasma reactor, particle condensation within the reactor is generally inevitable and represents an adverse problem often responsible for reactor blockage and loss of productivity. Moreover, such adverse particle condensation represents a potential for product loss in addition to becoming a potential source of contamination of the nanopowder product.

In a number of plasma applications, the quench gas can also be reactive in nature (i.e. be a reactant) thus giving rise to chemical andor physical modifications of the nanopowder product. A reactive quench gas has been widely used in the synthesis of metal oxide nanopowders as well as in the synthesis of nitride and carbide nanopowder materials.

A common challenge to plasma related processes, whether including reactive or passive quenching, whether for the purpose of producing nanopowder materials or merely for melting and consolidating materials, resides in the difficulty of controlling the temperature field within the reactor and thus the thermo-chemical conditions to which the materials are exposed.

The present specification refers to a number of documents, the content of which is herein incorporated by reference in their entirety.

SUMMARY

The present specification relates to novel process and apparatus for producing nanopowders and materials processing.

As broadly claimed, the present specification relates to a novel plasma reactor comprising a torch body and a reactor section in which the temperature field is readily controlled. In an embodiment, the present specification relates to a plasma reactor comprising a first power supply for generating a plasma in the torch body and a second power supply for heating the walls of the reactor section. In a more specific embodiment of the present specification, the second power supply comprises a plurality of secondary power supplies.

In a further embodiment, the present specification relates to a plasma reactor comprising an induction plasma torch powered by a first power supply and a reactor section comprising a second power supply for heating the walls of the reactor section. In a more specific embodiment of the present specification, the second power supply comprises a plurality of secondary power supplies.

In yet a further embodiment, the present specification relates to a plasma reactor comprising a direct current (dc) plasma torch or a transferred arc plasma torch powered by a first power supply and a reactor section comprising a second power supply for heating the walls of the reactor section. In a more specific embodiment of the present specification, the second power supply comprises a plurality of secondary power supplies.

In an embodiment, the present specification relates to a novel process for the preparation of nanopowders and materials processing, the process comprising feeding a precursor material into a plasma reactor comprising an induction plasma torch powered by a first power supply and a reactor section comprising a second power supply for heating the walls of the reactor section. In a more specific embodiment of the present specification, the second power supply comprises a plurality of secondary power supplies.

In an embodiment, the present specification relates to a novel process for the preparation of nanopowders and materials processing, the process comprising feeding a precursor material into a plasma reactor comprising a direct current (dc) plasma torch or a transferred arc plasma torch powered by a first power supply and a reactor section comprising a second power supply for heating the walls of the reactor section. In a more specific embodiment of the present specification, the second power supply comprises a plurality of secondary power supplies.

In an embodiment, the present specification relates to a nanopowder material produced using a plasma reactor comprising a torch body powered by a first power supply and a reactor section comprising a second power supply for heating the walls of the reactor section. In a more specific embodiment of the present specification, the second power supply comprises a plurality of secondary power supplies.

In an embodiment, the present specification relates to a processed material produced using a plasma reactor comprising a torch body powered by a first power supply and a reactor section comprising a second power supply for heating the walls of the reactor section. In a more specific embodiment of the present specification, the second power supply comprises a plurality of secondary power supplies.

In an embodiment, the present specification relates to a plasma reactor comprising a torch body comprising a plasma torch for generating a plasma; a reactor section in fluid communication with the torch body for receiving a plasma discharge and further being in fluid communication with a quench section; and at least one heating element in thermal communication with the reactor section, wherein the at least one heating element provides for selectively modulating the temperature within the reactor section. In further embodiment of the present specification, the plasma reactor comprises a torch body that may further comprise an inlet. In further embodiment of the present specification, the plasma reactor comprises a reactor section defining a reaction chamber. In further embodiment of the present specification, the reactor section is mounted to the torch body. In further embodiment of the present specification, the plasma reactor comprises at least one heating element mounted to the reactor chamber. In further embodiment of the present specification, the plasma reactor comprises a reaction chamber comprising a wall surface defining the chamber, and wherein a heating element provides for heating the wall surface. In further embodiment of the present specification, the plasma reactor comprises at least one heating element that circumscribes the reaction chamber. In further embodiment of the present specification, the plasma reactor comprises a reactor chamber comprising an outer surface and wherein a heating element is mounted on the outer surface. In further embodiment of the present specification, the plasma reactor comprises a heating element embedded within the wall surface defining the reaction chamber. In further embodiment of the present specification, the plasma reactor comprises a plurality of heating elements mounted along the length of the reaction chamber. In further embodiment of the present specification, the plasma reactor comprises a quench section defining a quench chamber and being mounted to the reactor section. In further embodiment of the present specification, the heating element comprises an inductive coil. In further embodiment of the present specification, the heating element is selected from the group consisting of an inductive coil, a resistive dc heating element, and an ac heating element. In further embodiment of the present specification, the plasma reactor comprises at least one heating element that modulates the temperature within the reaction chamber as to establish a temperature field along the center line of the reaction chamber.

In further embodiment of the present specification, the plasma reactor comprises a quench section comprising an inner wall defining the quench chamber, the quench chamber having an upstream end thereof adjacent the reaction chamber and an opposite downstream end. In further embodiment of the present specification, the downstream chamber end is wider than the upstream chamber end. In further embodiment of the present specification, the quench chamber comprises a generally frusto-conical configuration. In further embodiment of the present specification, the inner wall of the quench chamber comprises a serrated configuration. In further embodiment of the present specification, the inner wall of the quench chamber comprises a series of adjacent segments. In further embodiment of the present specification, the inner wall of the quench chamber comprises a series of concentric conical segments. In further embodiment of the present specification, the inner wall of the quench chamber comprises multiple openings distributed around the periphery thereof for providing a quench gas flow over the inner wall of the quench chamber. In further embodiment of the present specification, the inner wall of the quench chamber comprises radial openings for introducing respective gas jets into the quench chamber.

In further embodiment of the present specification, the plasma reactor comprises at least one heating element linked to a controller for selective modulation thereof. In further embodiment of the present specification, the controller is linked to a power supply providing power to the heating element, the controller providing for selectively modulating the power supply.

In further embodiment of the present specification, the plasma reactor comprises a plurality of heating elements linked to a controller for modulation thereof.

In further embodiment of the present specification, the plasma reactor comprises a plurality of heating elements linked to a controller for modulation thereof and wherein each heating element is connected to a respective power supply providing power thereto, the controller being linked to each power supply for selective modulation thereof.

In further embodiment of the present specification, the plasma reactor comprises a plurality of heating elements linked to a controller for modulation thereof and wherein the controller is linked to a power supply providing power to the heating elements, the controller providing for selectively modulating the power supply.

In further embodiment of the present specification, the plasma reactor comprises a plurality of heating elements linked to a respective controller for modulation thereof. In further embodiment of the present specification, the plasma reactor comprises a plurality of heating elements linked to a respective controller for modulation thereof and wherein each controller is connected to a respective power supply linked to a respective heating element for providing power thereto, each controller providing for selectively modulating a respective power supply.

In an embodiment, the present specification relates to a plasma reactor comprising a torch body comprising a plasma torch for generating a plasma; a reactor section in fluid communication with the torch body for receiving a plasma discharge; and a quench section in fluid communication with the reactor section, the quench section comprising an inner wall defining a quench chamber having an upstream end thereof adjacent the reactor section and an opposite downstream end, the inner wall comprising a series of annular segments, wherein the length of the quench chamber is modifiable by the removal or addition of at least one annular segment. In further embodiment of the present specification, the downstream end of the quench chamber is wider than the upstream end. In further embodiment of the present specification, the quench chamber comprises a generally frusto-conical configuration. In further embodiment of the present specification, the series of annular segments provide the inner wall with a serrated configuration. In further embodiment of the present specification, the series of annular segments are concentric. In further embodiment of the present specification, the series of annular segments are conical. In further embodiment of the present specification, the inner wall further comprises an opening between an adjacent pair of the annular segments. In further embodiment of the present specification, the inner wall further comprises radial openings between each an adjacent pair of the annular segments.

In an embodiment, the present specification relates to a process for synthesizing a nanopowder or materials processing comprising submitting a precursor material to a plasma flow thereby vaporizing the precursor material; submitting the vaporized material to a temperature profile providing for particle nucleation of the vaporized material; selectively modulating the temperature profile; and quenching the nucleated material. In further embodiment of the present specification, the vaporized material floes along the length of a reaction chamber when submitted to the temperature profile. In further embodiment of the present specification, the process further comprises the step of modulating the temperature profile along the length of the reaction chamber.

In an embodiment, the present specification relates to a nanopowder produced by the process of the present specification.

In an embodiment, the present specification relates to a processed material produced by the process of the present specification.

In an embodiment, the present specification relates to a nanopowder produced using the plasma reactor of the present specification.

In an embodiment, the present specification relates to a processed material produced using the plasma reactor of the present specification.

The foregoing and other objects, advantages and features of the present specification will become more apparent upon the reading of the following non-restrictive description of illustrative embodiments thereof, given by way of example only with reference to the accompanying drawings.

BRIEF DESCRIPTION OF THE DRAWINGS

In the appended drawings:

FIG. 6 is a schematic cross-sectional elevation view of a plasma reactor 60 in accordance with an embodiment of the present specification; the plasma reactor 60 comprises a torch body 62 including a pair of d.c. transferred arc plasma torches 63 powered by a single or two independent direct current (dc) power supplies (not shown) and a reactor section 64 equipped with an auxiliary induction coil 66 for heating the wall 68 of the reactor section 64 . The plasma torch body 62 further comprises an auxiliary induction coil 70 for heating the crucible 72 containing the precursor material and an auxiliary anode 74 positioned at the bottom of the crucible 72 . Finally, a quench section 76 is affixed to the upper end of the reactor section 64. The quench section 76 comprises a frusto-conical quench chamber 78 including a serrated (saw-like) inner wall 80. The quench section comprises at least one inlet 82 for injecting a quench gas into the quench chamber 78 such that a gas flow is created over the inner wall 80 of the quench chamber 78.

FIG. 8 shows a Field. Emission Scanning Electron Microscope (SEM) micrograph of a nickel nanopowder obtained using a plasma reactor in accordance with an embodiment of the present specification comprising a reactor section equipped with an auxiliary induction coil powered at 12 kW. Increasing the power of the auxiliary induction coil (FIG. 7 vs. FIG. 8) appears to have a direct effect on the particle size distribution of the nanopowder product.

DESCRIPTION

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this invention pertains.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

As broadly described, the present specification relates to a novel plasma reactor comprising a torch body powered by a first power supply and a reactor section comprising a second power supply for heating the walls of the reactor section. It was surprisingly discovered that by independently controlling the temperature of the walls of the reactor section, an effective control over the temperature field within the reactor section can be achieved.

Description as Applied to an Inductively Coupled Plasma Reactor.

Figure 2:
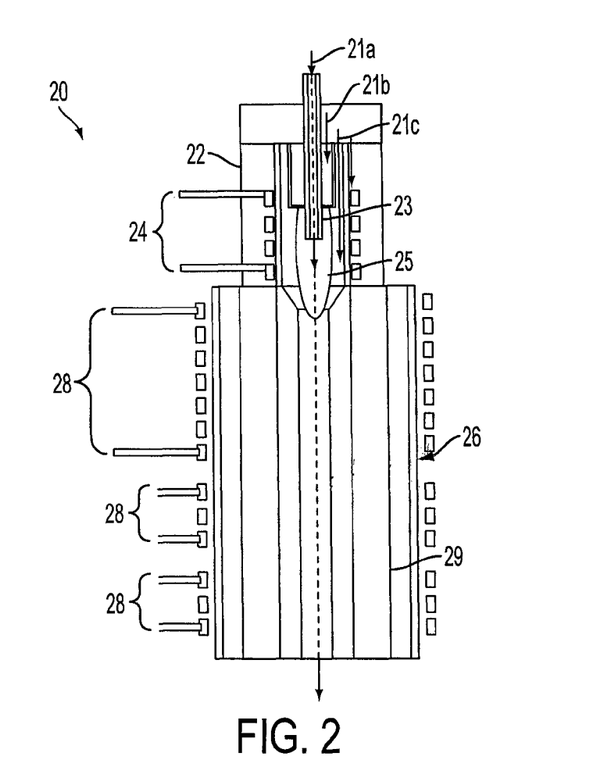
FIG. 2 is a schematic cross-sectional elevation view of a plasma reactor 20 in accordance with an embodiment of the present specification; the plasma reactor 20 comprising an induction plasma torch body 22 including a first induction coil 24 powered by a first power supply (not shown) and a reactor section 26 comprising a plurality of auxiliary induction coils 28 powered by a single or a plurality of secondary power supplies (not shown) for heating the walls 29 of the reactor section 26 .

In an embodiment, and with reference to FIG. 2, the present specification relates to a plasma reactor 20 comprising: (i) a torch body 22 including a radio frequency (r.f.)

induction plasma torch 23 including an induction coil 24 powered by a first power supply (not shown); and (ii) a reactor section 26 comprising a plurality of auxiliary induction coils 28 powered by a single or a plurality of secondary power supplies (not shown) for heating the wall 29 of the reactor section 26. The torch body 22 further comprises an inlet 21a for introducing a precursor material. The plasma used to heat the precursor material is produced by the induction plasma torch 23 by passing a gas (i.e. working gas) through the electromagnetic field produced by the induction plasma torch 23. The electromagnetic field should have a power sufficiently high to cause, by induction, the gas to ionize and thereby produce and sustain a plasma 25. The working gas could be any gas which will ionize when subjected to the high electromagnetic field. Non-limiting examples of working gases include helium, argon, carbon monoxide, oxygen or mixtures thereof. The torch body 22 further comprises inlets 21b and 21c for introducing the working gas (inlet 21b) and optionally a sheath gas (inlet 21c).

The plurality of auxiliary induction coils 28 provide for the independent heating of the wall 29 of the reactor section 26 such that the temperature field within the reactor section 26 can be effectively and independently controlled. An inductively coupled plasma 25 is generated by applying a RF electric current to a first induction coil 24 located in the torch body 22. The auxiliary induction coils 28, powered by the secondary power supply, allow for the wall of the reactor section 26 to be heated. Even though an embodiment comprising a plurality (3) of auxiliary induction coils is illustrated, any number of auxiliary coil(s) providing for the independent and separate heating of the wall of the reactor section 26 is within the scope of the present specification. Non-limiting examples include 1, 2, 3, 4, 5, 6, 7, 8, 9 and 10 auxiliary induction coils. The auxiliary induction coils may each be connected to a separate power supply (plurality of secondary power supplies) or interconnected in parallel and/or in series to a secondary power supply.

By individually controlling each of the secondary power supplies, it was surprisingly discovered that it is possible to effectively control and fine tune the temperature field within the reactor section to meet the process requirements. Moreover, inductively heating the wall of the reactor section provides for the first time for an effective and independent control of the temperature field in the nanoparticle nucleation and particle growth section of the reactor. This in turn allows for closely controlling the particle composition and the particle size distribution of the nanopowders produced. Finally, the use of one or more auxiliary induction coils for independently heating the wall of the reactor section provides for the added advantage of preventing blockage of the reactor system by avoiding premature particle condensation and thus preventing the deposition and accumulation of solid deposits on the reactor walls. By keeping the temperature of the reactor wall above the melting point of the precursor material, product or processed material, any material deposited on the inner walls of the reactor would remain in the liquid state and be evacuated down along the reactor wall collecting in a suitable receiving means located downstream the plasma reactor. Non-limiting examples of suitable receiving means include ceramic crucibles and containers.

Figure 3:
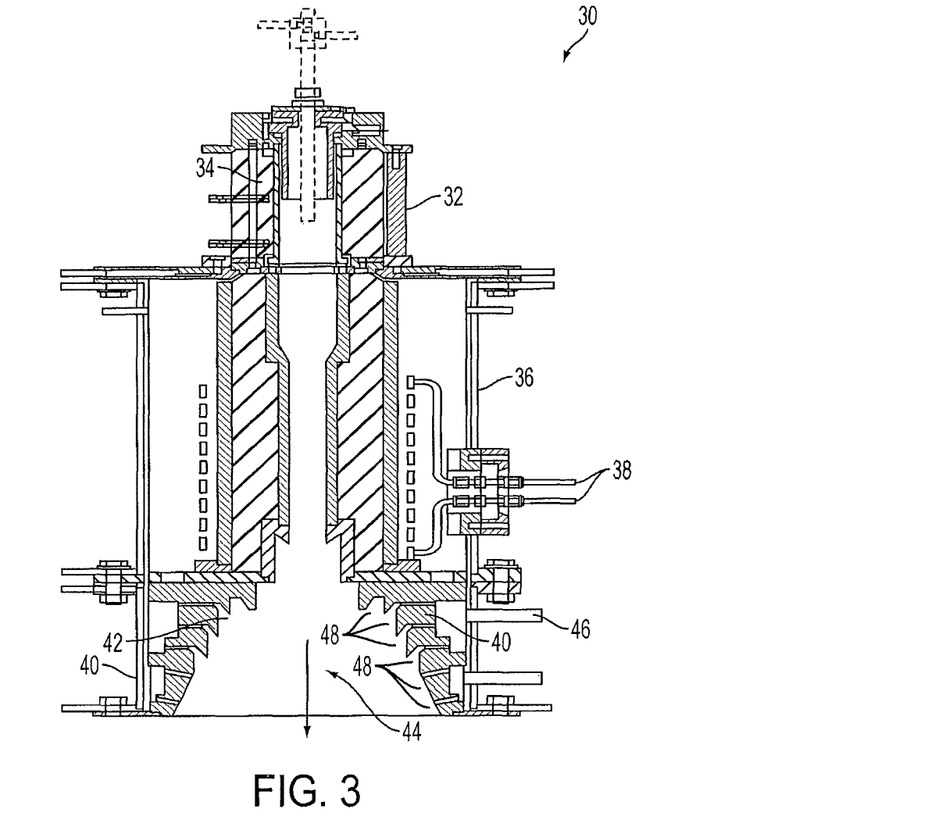
FIG. 3 is a schematic cross-sectional elevation view of a plasma reactor 30 in accordance with an embodiment of the present specification, the plasma reactor 30 comprising a torch body 32 including an r.f. induction plasma torch 34 , and a reactor section 36 equipped with a single auxiliary induction coil 38 and a quench section 40 affixed to the lower end of the reactor section 36 .

In an embodiment, and with reference to FIG. 3, the quench section 40 comprises a downstream frusto-conical quench chamber 44 including a serrated (saw-like) inner wall 42. The quench section comprises at least one inlet 46 for injecting a quench gas into the quench chamber 44 such that a gas flow is created over the inner wall 42 of the quench chamber 44. In an embodiment, the inner wall 42 is formed by a series of concentric conical segments 48. Injection of a quench gas through multiple openings distributed around the periphery of the inner wall 42 provides for the creation of a continuous quench gas flow (i.e. a gas curtain) which flows over the inner wall of the next segment, thus preventing particle deposition thereon. In an embodiment, individual gas jets are introduced in a radial direction at the downstream end of the quench chamber 44 creating a direct mixing effect with the process gas stream providing for the rapid quenching and complete halting of the particle growth process.

The frusto-conical design comprising a series of concentric conical segments 48 provides for greater flexibility having regard to the length of the quench section 40 as individual segments may be added or removed. Moreover, the design also provides for enhanced control over the flow pattern within the quench chamber 44 of the plasma reactor and avoids particle deposition on the inner wall 42 of the quench chamber 44. Improved control over the flow pattern and the avoidance of particle deposition on the inner wall 42 of the quench chamber 44 contributes to improved control over the particle size distribution of the product as well as improving reactor performance. It is believed to be within the skill of a person skilled in the art to determine and select other quenching chamber configurations without departing from the spirit, scope and nature of the subject specification.

Figure 4A:
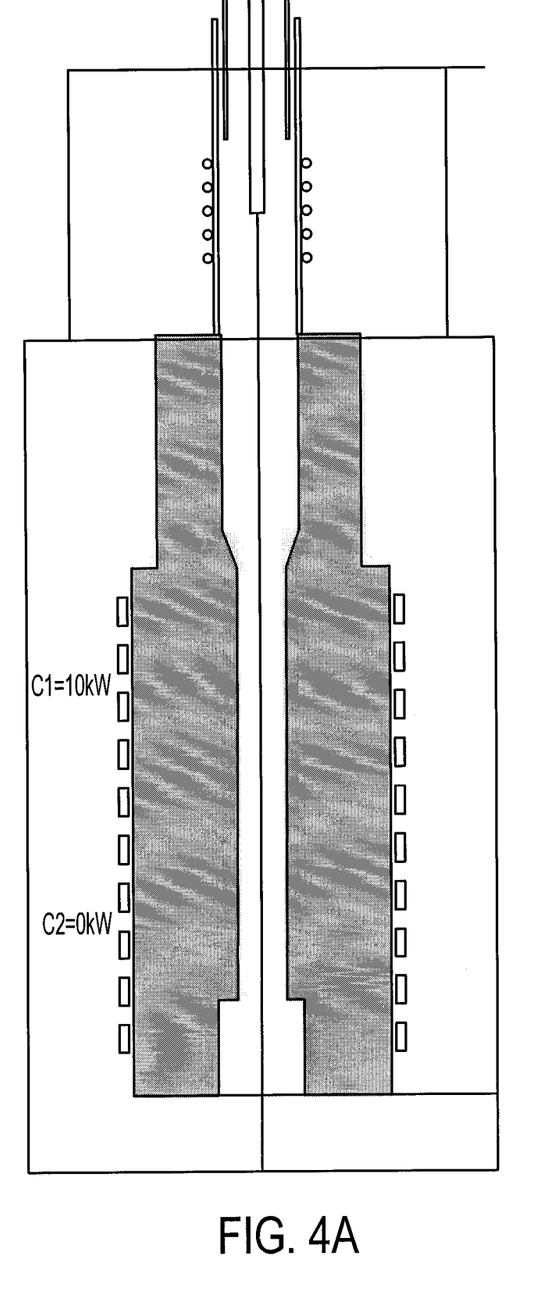
FIG. 4 is an illustration of the temperature isocontours in the reactor section of a plasma reactor in accordance with an embodiment of the present specification, the reactor section comprising a pair of auxiliary induction coils [(a) C1=10 kW and C2=0 kW] showing: (b) the temperature field along the center line of the reactor section; and (c) the wall temperature of the reactor section.
Figure 4B:
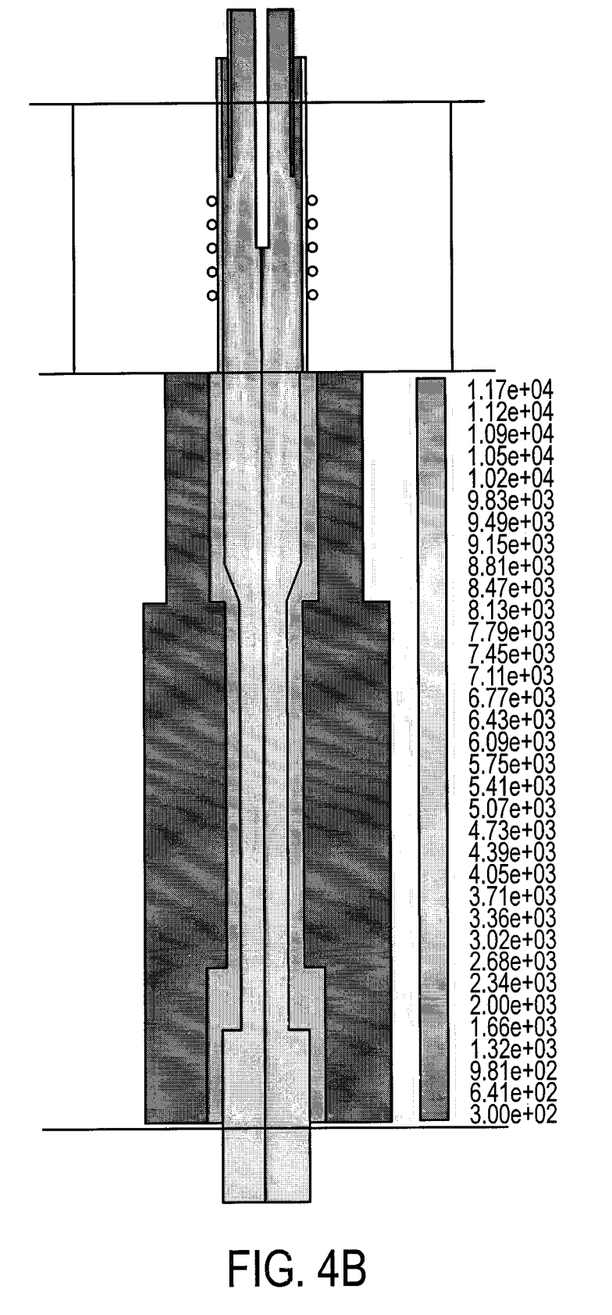
Figure 4C:
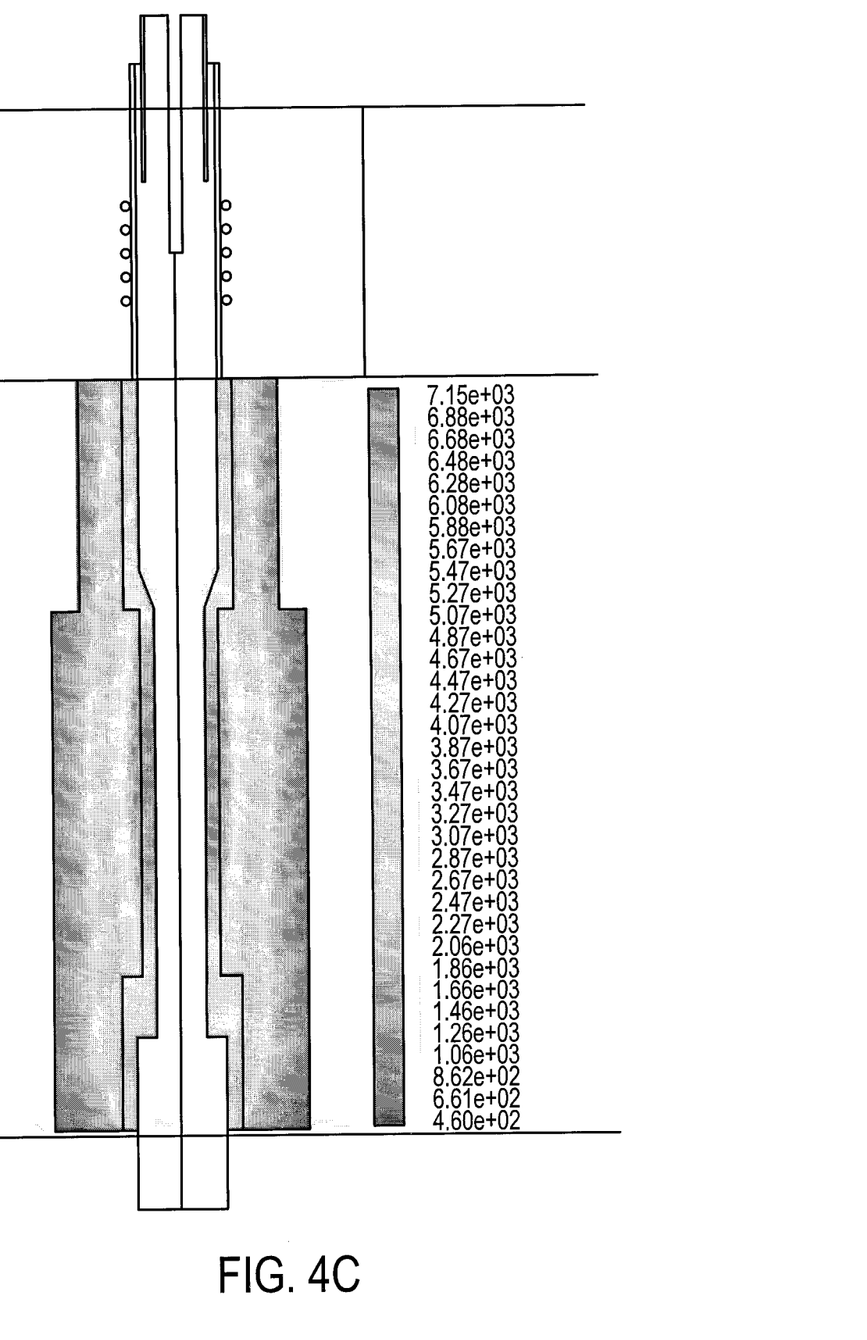
Figure 5:
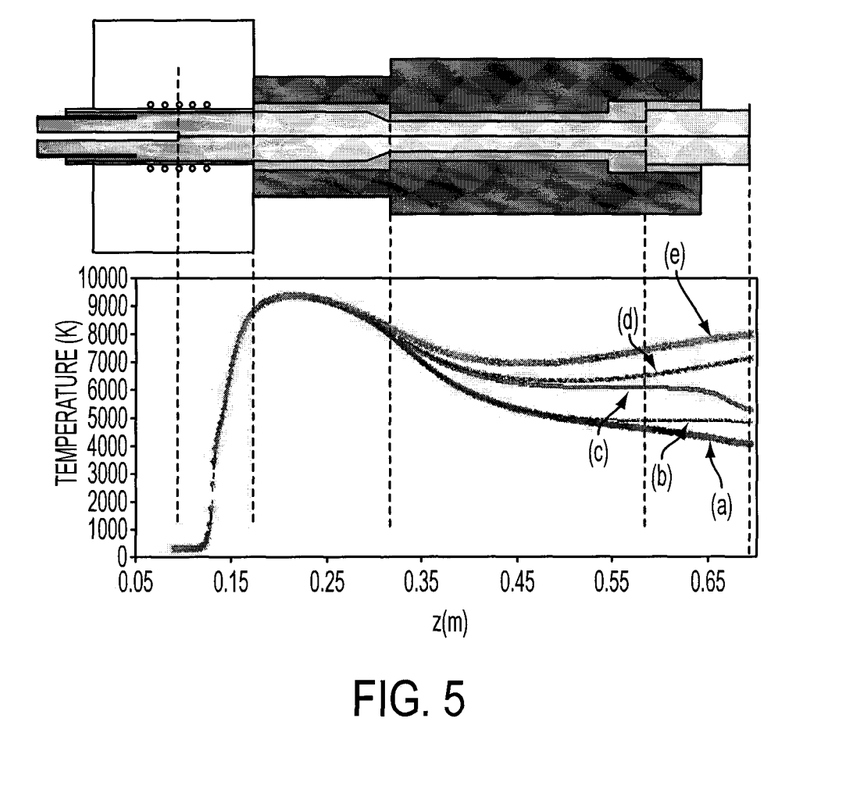
FIG. 5 is an illustration of the effect of auxiliary coil heating on the temperature isocontours as measured along the center line of the reactor section of a plasma reactor in accordance with an embodiment of the present specification. The walls of the reactor section are independently heated by a pair of auxiliary induction coils (C1 and C2) powered between 0 and 30 kW [(a) wall induction heating off; (b) C1=0 kW and C2=10 kW; (c) C1=10 kW and C2=0 kW; (d) C1=10 kW and C2=30 kW; and (e) C1=30 kW and C2=10 kW).

A mathematical modeling study of the gas flow and temperature field within the reactor section of the plasma reactor of the present specification is illustrated in FIGS. 4 and 5. The results illustrate the improved control over the temperature field within the reactor section that is achieved by means of the reactor design of the present specification. Indeed, improved control over the temperature field within the reactor section has a direct impact on the particle size distribution and particle morphology of the nanopowder or processed material produced. The effect of auxiliary heating and the control thereof on the temperature profile, as calculated along the center line of the reactor section, is clearly illustrated in FIG. 5. When no auxiliary heating is used (auxiliary power sources C1 and C2 are switched off), the temperature profile along the center line of the reactor section gradually decreases (FIG. 5a; wall induction heating off). When only one of the modules of the auxiliary heating is used (C1=0 and C2=10 kW), a flattening of the temperature profile along the center line of the reactor section at a downstream end thereof is observed (FIG. 5b). However, switching C1 on (C1=10 kW) and switching C2 off (C2=0) provides for an increase in the temperature along the center line of the reactor section in both the central and downstream sections thereof (FIG. 5c). When both of the modules of the auxiliary heating are used (C1=30 kW and C2=10 kW; C1=10 kW and C2=30 kW) an increase in the temperature profile is observed along the center line of the reactor section (FIG. 5d and FIG. 5e). The temperature field in the reactor section can thus be fine tuned by a careful selection of the power ratings applied to the auxiliary power supplies. A desired temperature profile can thus achieved by a careful selection of the power ratings applied to the reactor wall. It is to be understood that even though a pair of auxiliary induction coils was used to illustrate the effect on the temperature profile, any number of auxiliary coil(s) providing for the independent and separate heating of the wall of the reactor section is within the scope of the present specification. Non-limiting examples include 1, 2, 3, 4, 5, 6, 7, 8, 9 and 10 auxiliary induction coils.

The efficiency of the plasma rector of the present specification for the synthesis of nanopowders is illustrated using nickel powder as the precursor material. Micron-size nickel powder was axially introduced into an inductively coupled r.f. plasma torch through a central injection probe. As the nickel powder comes into contact with the plasma, it is heated, melted and evaporated. The produced vapor is subsequently carried from the torch body to the reactor section by the entrainment of the plasma gasses. In the reactor section, the vapor is subjected to a carefully controlled temperature field produced by the auxiliary induction coils. This temperature field ensures a carefully controlled condensation zone in which the nickel vapor nucleates and condenses. The nucleation and growth rate of the nickel particles is directly related to the temperature field created in the reactor section. Changing the power settings of the auxiliary induction coils has a direct effect on the temperature field within the reactor section. Indeed, by creating a specific temperature field within the reactor section, it is possible to control the growth rate of the nickel particles and thus the final particle size distribution of the nickel nanopowder product. In the absence of auxiliary heating, particle condensation on the inner wall of the reactor was frequently observed. Such repeated deposition eventually results in the build-up of a thick layer that adversely affects reactor performance and ultimately leads to reactor blockage. Additionally, the presence of such a layer adversely affects the particle size distribution of the produced nanopowder.

Figure 7:
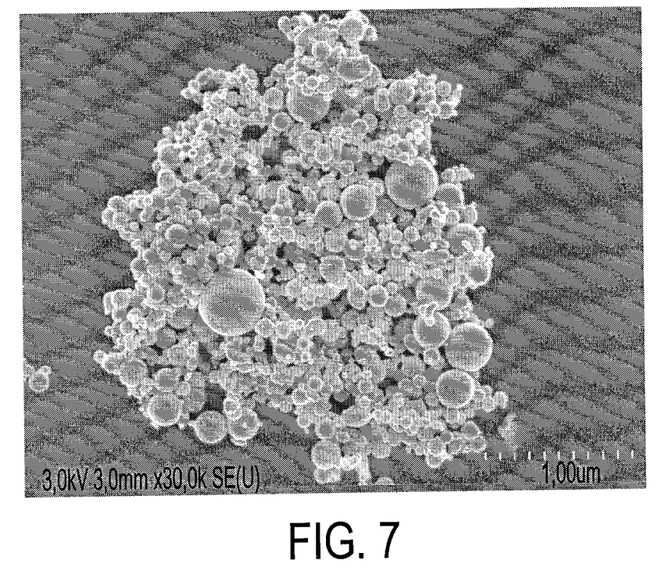
FIG. 7 shows a Field Emission Scanning Electron Microscope (SEM) micrograph of a nickel nanopowder obtained using a plasma reactor in accordance with an embodiment of the present specification comprising a reactor section equipped with an auxiliary induction coil powered at 8.7 kW.
Figure 8:
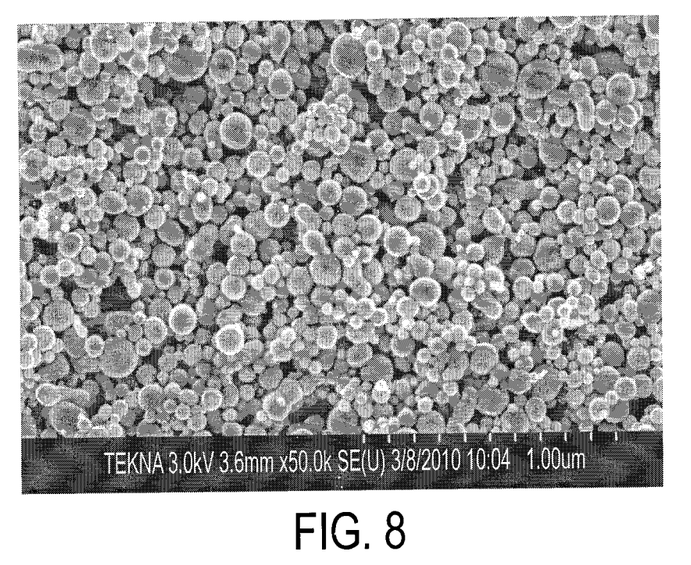

Field Emission Scanning Electron Microscope (SEM) micrographs of the nickel nanopowder produced are shown in FIGS. 7 and 8. The operating conditions were as follows: Plasma gas flow rate: sheath gas 90 slpm (Ar)+20 slpm ($H_2$); central gas 30 slpm (Ar); and powder carrying gas 10 to 12 slpm (Ar). The radio frequency applied to the plasma torch induction coil ranged from 2-3 MHz and the applied power was 63 kW. The power applied to the auxiliary coils (100 kHz) varied between 8-12 kW. The total quench gas flow rate was 2500 slpm. As can be observed from FIGS. 7 and 8, increasing the power applied to the auxiliary coil has a direct effect on the particle size distribution of the nanopowder product. Moreover, there appears to be less powder agglomeration in FIG. 8 relative to FIG. 7.

In an embodiment, the heating element or elements are linked to a controller for modulation thereof. The controller can include a computer, data processor or any other device for modulating the heating elements. The controller can be linked via a wire or wireless connection to the heating element or elements. In one embodiment, the controller comprises the switch or knob of the power supply. In another embodiment, the controller is linked to the power supply. This linkage can be provided via a wire or wireless connection. The heating elements can be linked to a power supply by various ways known in the art including wire or wireless connections. When using a plurality of heating elements, each heating element can be connected to a respective power supply modulated by the controller; alternatively, the heating elements can be connected to the same power supply. Of course, when using a plurality of heating elements, each heating element can be linked to a respective controller which can either directly modulate each heating element or modulate the power supply of each heating element. The skilled artisan can easily contemplate a variety ways of operatively connecting or linking power supplies, controllers and heating elements within the scope of the present specification.

Description as Applied to a Direct Current (d.c.) Plasma Reactor.

In an embodiment, the present specification relates to a plasma reactor comprising: (i) a torch body including a direct current (d.c.) transferred arc plasma torch powered by a first power supply; and (ii) a reactor section comprising a plurality of auxiliary induction coils powered by a single or a plurality of secondary power supplies (not shown) for heating the wall of the reactor section. The plurality of auxiliary induction coils provide for the independent heating of the wall of the reactor section such that the temperature field within the reactor section can be effectively and independently controlled.

Figure 6:
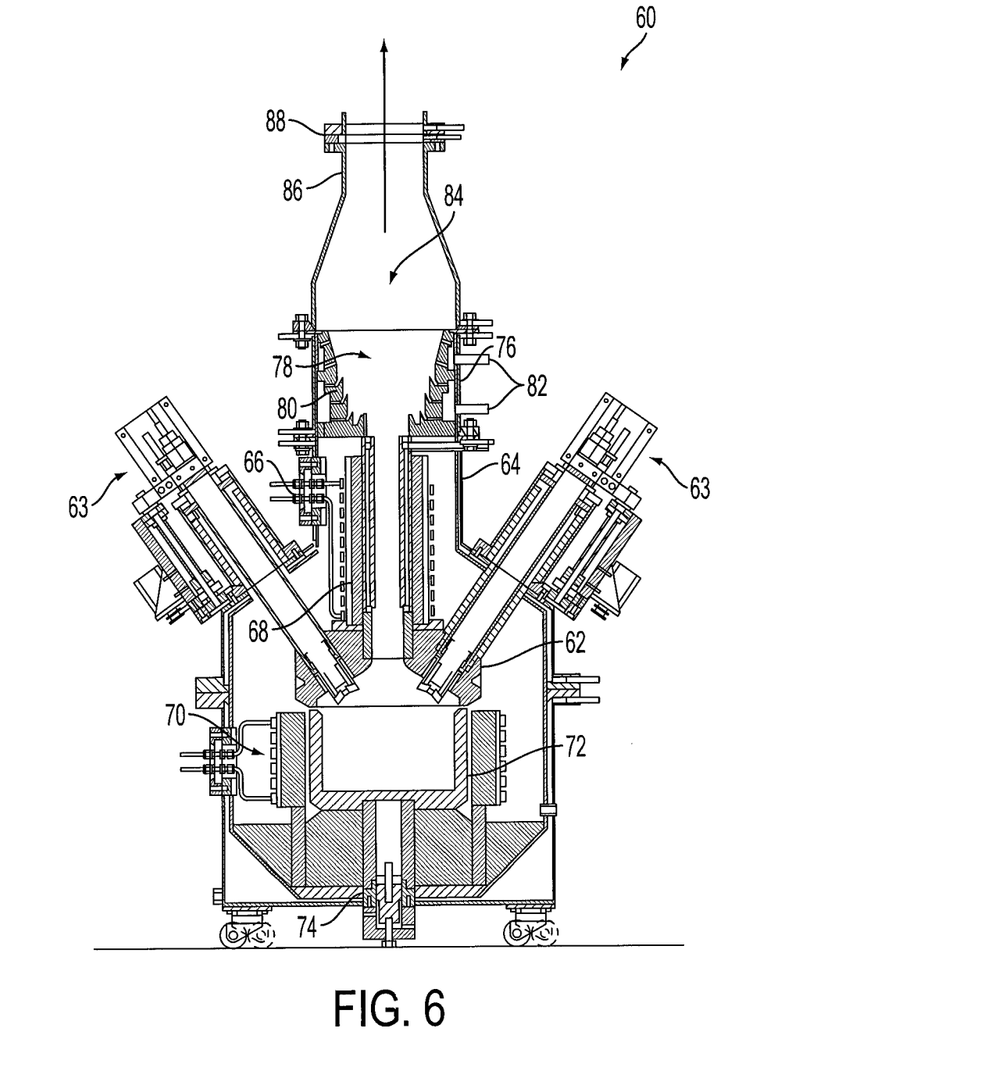

In a further embodiment, and with reference to FIG. 6, the present specification relates to a plasma reactor 60 comprising: (i) a torch body 62 including a pair of direct current (d.c.) plasma torches 63 operating either in transferred or non-transferred arc mode and powered by a single or two independent direct current (d.c.) power supplies (not shown); and (ii) a reactor section 64 comprising an auxiliary induction coil 66 powered by a second power supply (not shown) for heating the wall 68 of the reactor section 64. It is to be understood that even though a single auxiliary induction coil is illustrated, any number of auxiliary coil(s) providing for the independent and separate heating of the wall 68 of the reactor section 64 is within the scope of the present specification. Non-limiting examples include 1, 2, 3, 4, 5, 6, 7, 8, 9 and 10 auxiliary induction coils. In an embodiment of the present specification, a further auxiliary coil 70 is used for heating the crucible 72 to a temperature sufficiently high to vaporizing the precursor material contained therein. This can serve to provide additional energy to the crucible thus increasing the overall precursor evaporation rate. Moreover, it could also serve to keep the precursor material in a molten form between production runs. The auxiliary coil(s) 66 ensures that the temperature field within the reactor section 64 can be effectively and independently controlled. This temperature field ensures a carefully controlled condensation zone in which the product nucleates and condenses. The dual torch arc furnace operates by either striking a plasma arc between each cathode and its auxiliary anode (as two independent d.c. non-transferred torches), between the two torches with the first torch acting as cathode and the second torch acting as anode (torch-to-torch transferred arc), or between the two torches and a common auxiliary anode 74 located at the bottom of the crucible containing the precursor material (torch-to-crucible transferred arc).

In an embodiment of the present specification, the exit of the plasma reactor 64 comprises a central chimney 84 having a wall 86 that is inductively heated by at least one further auxiliary coil 88. The use of such an auxiliary coil provides for an effective and independent control of the temperature field within the chimney 84. It is of importance to maintain a close control over the axial and radial temperature profiles within the reactor section 64 and central chimney 84 in order to provide a product having a narrow particle size distribution.

The effect of auxiliary heating and the control thereof on the temperature profile, as calculated along the center line of the reactor section, is again clearly illustrated in FIG. 5 (the reactor section 64 was equipped with a pair of auxiliary induction coils 66). When no auxiliary heating is used (auxiliary power sources C1 and C2 are switched off), the temperature profile along the center line of the reactor section gradually decreases (FIG. 5*a*; wall induction heating off). When only one of the modules of the auxiliary heating is used (C1=0 and C2=10 kW), a flattening of the temperature profile along the center line of the reactor section at a downstream end thereof is observed (FIG. 5b). However, switching C1 on (C1=10 kW) and switching C2 off (C2=0) provides for an increase in the temperature along the center line of the reactor section in both the central and downstream sections thereof (FIG. 5c). When both of the modules of the auxiliary heating are used (C1=30 kW and C2=10 kW; C1=10 kW and C2=30 kW) an increase in the temperature profile is observed along the center line of the reactor section (FIG. 5d and FIG. 5e). The temperature field in the reactor section can thus be fine tuned by a careful selection of the power ratings applied to the auxiliary power supplies. A desired temperature profile can thus achieved by a careful selection of the power ratings applied to the reactor wall. It is to be understood that even though a pair of auxiliary induction coils was used to illustrate the effect on the temperature profile, any number of auxiliary coil(s) providing for the independent and separate heating of the walls of the reactor section is within the scope of the present specification. Non-limiting examples include 1, 2, 3, 4, 5, 6, 7, 8, 9 and 10 auxiliary induction coils.

Independently heating the wall 68 of the reactor section 64 and the wall 86 of the central chimney 84 provides for the added advantage of preventing blockage of the reactor section 64 and the chimney 84 by avoiding premature particle condensation therein. Indeed, such auxiliary heating prevents the deposition and accumulation of solid deposits on the inner wall of the reactor section and chimney. By keeping the temperature of the reactor wall and chimney wall above the melting point of the precursor material, product or processed material, any material deposited on the inner walls of the reactor and/or chimney would remain in the liquid state and be evacuated down along the reactor and chimney walls back into the crucible containing the molten pool of precursor material.

Inductively heating the chimney also provides for the added advantage of preheating any reactive gas or other to be added to the plasma flow. Suitable auxiliary gas inlets are typically positioned at or near the top of the chimney 84. The introduction of a reactive gas allows for chemical and/or physical modifications of the nanopowder product.

With reference to FIG. 6, and as previously described with reference to FIG. 3, the quench section 76 comprises an upstream expanding frusto-conical quench chamber 78 including a serrated (saw-like) inner wall 80. The serrated design avoids particle deposition on the walls of the quench chamber 78. Improved control over the flow pattern and the avoidance of particle deposition within the quench section 76 con tribute to improved control over the particle size distribution of the product as well as improving reactor performance. It is believed to be within the skill of an expert in the art to determine and select other quenching chamber configurations without departing from the spirit, scope and nature of the subject invention.

It is to be understood that the specification is not limited in its application to the details of construction and parts as described hereinabove. The specification is capable of other embodiments and of being practiced in various ways. It is also understood that the phraseology or terminology used herein is for the purpose of description and not limitation. Hence, although the present specification has been provided hereinabove with illustrative embodiments, it can be modified, without departing from the spirit, scope and nature thereof as defined in the appended claims.

What is claimed is:

1. A plasma reactor comprising:
    a torch body comprising a plasma torch for generating a plasma;
    a reactor section in fluid communication with the torch body for receiving the plasma from the plasma torch;
    a quench section in fluid communication with the reactor section,
    wherein the quench section comprises a frusto-conical quench chamber,
    wherein the frusto-conical quench chamber comprises an inner wall of a serrated configuration, and
    wherein the frusto-conical quench chamber comprises an upstream end having a first diameter adjacent the reactor section and an opposite downstream end having a second diameter larger than the first diameter; and
    at least one heating element in thermal communication with the reactor section,
    wherein the at least one heating element provides for selectively modulating a temperature within the reactor section.

2. The plasma reactor according to claim 1, wherein the reactor section defines a reaction chamber.

3. The plasma reactor according to claim 2, wherein the at least one heating element is mounted to the reaction chamber.

4. The plasma reactor according to claim 3, wherein the reaction chamber comprises a wall surface defining the reaction chamber, the heating element providing for heating the wall surface.

5. The plasma reactor according to claim 3, wherein the at least one heating element circumscribes the reaction chamber.

6. The plasma reactor according to claim 2, wherein the reaction chamber comprises an outer surface, the heating element being mounted on the outer surface.

7. The plasma reactor according to claim 4, wherein the heating element is embedded within the wall surface defining the reaction chamber.

8. The plasma reactor according to claim 2, comprising further heating elements mounted along a length of the reaction chamber.

9. The plasma reactor according to claim 1, wherein the quench section defining the frusto-conical quench chamber is mounted to the reactor section.

10. The plasma reactor according to claim 1, wherein the heating element is selected from the group consisting of an inductive coil, a resistive dc heating element, and an ac heating element.

11. The plasma reactor according to claim 2, wherein the at least one heating element so modulates the temperature within the reaction chamber as to establish a temperature profile along a center line of the reaction chamber.

12. The plasma reactor according to claim 1, wherein the serrated configuration of the inner wall is defined by a series of adjacent segments.

13. The plasma reactor according to claim 1, wherein the inner wall comprises a series of concentric and conical segments.

14. The plasma reactor according to claim 1, wherein the inner wall comprises multiple openings distributed around a periphery thereof for providing a quench gas flow over the inner wall of the frusto-conical quench chamber.

15. The plasma reactor according to claim 1, wherein the inner wall comprises radial openings for introducing respective gas jets into the frusto-conical quench chamber.

16. The plasma reactor according to claim 1, wherein the at least one heating element is linked to a controller for selective modulation thereof.

17. The plasma reactor according to claim 16, wherein the controller is linked to a power supply providing power to the heating element, the controller providing for selectively modulating the power supply.

18. The plasma reactor according to claim 1, comprising a plurality of heating elements linked to a controller for modulation thereof.

19. The plasma reactor according to claim 18, wherein each heating element is connected to a respective power supply providing power thereto, the controller being linked to each power supply for selective modulation thereof.

20. The plasma reactor according to claim 18, wherein the controller is linked to a power supply providing power to the heating elements, the controller providing for selectively modulating the power supply.

21. The plasma reactor according to claim 1, comprising a plurality of heating elements linked to a respective controller for modulation thereof.

22. The plasma reactor according to claim 21, wherein each controller is connected to a respective power supply linked to a respective heating element for providing power thereto, each controller providing for selectively modulating a respective power supply.

23. A nanopowder produced using the plasma reactor of claim 1.

24. A processed material produced using the plasma reactor of claim 1.

* * * * *